(12) United States Patent
Forlino et al.

(10) Patent No.: US 7,186,478 B2
(45) Date of Patent: *Mar. 6, 2007

(54) ELECTROCHEMICAL DEVICE

(75) Inventors: Jay M. Forlino, Landenburg, PA (US); Andrew J. Manning, Randolph, NJ (US); Eran Turi, Richboro, PA (US)

(73) Assignee: Lithium Technology Corporation, Plymouth Meeting, PA (US)

( * ) Notice: Subject to any disclaimer, the term of this patent is extended or adjusted under 35 U.S.C. 154(b) by 456 days.

This patent is subject to a terminal disclaimer.

(21) Appl. No.: 10/351,623

(22) Filed: Jan. 23, 2003

(65) Prior Publication Data

US 2004/0146777 A1 Jul. 29, 2004

(51) Int. Cl.
*H01M 6/00* (2006.01)

(52) U.S. Cl. .................................... 429/122

(58) Field of Classification Search ............ None
See application file for complete search history.

(56) References Cited

U.S. PATENT DOCUMENTS

| | | | |
|---|---|---|---|
| 4,383,013 A * | 5/1983 | Bindin et al. ............. 419/112 |
| 4,605,603 A | 8/1986 | Kanda et al. .............. 429/59 |
| 4,732,825 A | 3/1988 | Kamata et al. ............ 429/162 |
| 4,804,593 A | 2/1989 | Hara et al. ............... 429/174 |
| 5,004,656 A | 4/1991 | Sato et al. ............... 429/162 |
| 5,057,385 A | 10/1991 | Hope et al. ............... 429/162 |
| 5,654,115 A | 8/1997 | Hasebe et al. ............ 429/218 |
| 5,667,907 A | 9/1997 | Audit et al. .............. 429/94 |
| 5,869,207 A | 2/1999 | Saidi et al. .............. 429/224 |
| 5,888,670 A | 3/1999 | Kawakami ............... 429/231.4 |
| 5,916,708 A | 6/1999 | Besenhard et al. ........ 429/199 |
| 6,132,900 A | 10/2000 | Yoshizawa et al. ........ 429/185 |
| 6,143,216 A | 11/2000 | Loch et al. ............... 264/45.1 |
| 6,145,280 A | 11/2000 | Daroux et al. ............ 53/433 |
| 6,171,723 B1 | 1/2001 | Loch et al. ............... 429/217 |
| 6,207,271 B1 | 3/2001 | Daroux et al. ............ 428/344 |
| 6,207,326 B1 | 3/2001 | Kawakami et al. ...... 429/231.95 |
| 6,265,098 B1 | 7/2001 | Audit et al. .............. 429/94 |
| 6,267,790 B1 | 7/2001 | Daroux et al. ............ 29/623.2 |
| 6,344,293 B1 | 2/2002 | Geronov .................. 429/218.1 |
| 6,387,561 B1 | 5/2002 | Nemoto et al. ........... 429/51 |
| 6,391,492 B1 | 5/2002 | Kawakami et al. ........ 429/209 |
| 6,899,975 B2 * | 5/2005 | Watanabe et al. ......... 429/156 |
| 2002/0034685 A1 * | 3/2002 | Sato et al. ............... 429/176 |

* cited by examiner

*Primary Examiner*—Patrick Joseph Ryan
*Assistant Examiner*—Karie O'Neill
(74) *Attorney, Agent, or Firm*—Drinker Biddle & Reath LLP; Daniel A. Monaco

(57) ABSTRACT

An electrochemical device includes an electrochemical device having an electrochemical cell located within the sealed first enclosure. The first enclosure has at least a portion that is flexible. A cavity is formed within the first enclosure so that the cavity is in fluidic communication with the electrochemical cell, and pressure inside the sealed first enclosure is less than one half pressure of pressure outside the sealed first enclosure.

31 Claims, 12 Drawing Sheets

ELECTROCHEMICAL DEVICE

FIELD OF THE INVENTION

The present invention is directed to an electrochemical device, and, in particular, to an electrochemical device having an anode in spaced relation to a cathode.

BACKGROUND OF THE INVENTION

As society becomes increasingly mobile and technologically advanced, batteries are playing a more important role. In particular, the need for batteries is growing especially rapidly due to the increasing use of mobile telephones, portable computers, camcorders, hybrid electric vehicles, and distributed power applications (including solar and remote).

For cost-effectiveness and for environmental protection, this demand for batteries has particularly increased the demand for rechargeable (or secondary) batteries. Consumers demand rechargeable batteries characterized by long cycle life, rapid charge capacity, high energy density, and small size and weight for powering their portable electronic devices.

Rechargeable batteries based on lithium metal anodes provide one approach to satisfying this demand due to their high energy density. Lithium ion batteries generally have an energy density greater than that of metal hydride cells and that of nickel/cadmium cells. The low internal resistance of a lithium cell that has a liquid electrolyte generally provides a solution with a higher power density and a greater cell life (i.e. more charge/discharge cycles).

It is desirable, and sometimes necessary, for a battery package to be sealed. A sealed package inhibits external contaminants from reacting with the cell and prevents the cell components from leaking out of the package. In the case of a lithium/lithium ion/lithium ion polymer cell in particular, an insufficient seal may result in the lithium/lithium electrolyte salt reacting with moisture in ambient air that enters the cell. The reaction can produce a passivation film on the lithium cathode surface which increases the internal resistance of the cell, thereby reducing cell performance. The reaction can also consume the lithium salt, thereby reducing cell performance. In the case of leakage of a liquid cell, in addition to not wanting the electrolyte to leak and thereby damage a device or harm a person, there are also is a risk of ignition of the liquid electrolyte solution.

Although it is desirable to seal a battery for the reasons described above, a sealed battery brings with it another set of problems. The charging and discharging (or sometimes overcharging, overdischarging, or short circuiting as the case may be) of a lithium cell often results in the generation of gas that causes the internal pressure of the cell to rise. The increase of internal pressure may cause the cell to deform and thereby deteriorate cell performance or perhaps even ultimately cause the seal to rupture and thereby terminally damage the cell. It is further desirable to use flexible pouch packaging. However, heat-sealed flexible pouch packaging allows a finite amount of diffusion of moisture and oxygen into the cell.

FIG. 1A is a cross-sectional diagram of a portion of a conventional flat battery 100. The battery 100 includes multiple layers of anodes 102, multiple layers of cathodes 104, and multiple layers of electrolyte 106 sealed in a flexible enclosure 108. The affects of the generation of gas are not shown in the battery 100 of FIG. 1A.

FIG. 1B is a cross-sectional diagram of a portion of the battery 100 shown in FIG. 1A that has experienced an increase in internal pressure and resulting loosening or deformation due to migration of gas through the seal or the generation of gas by chemical or electrochemical reaction. The gas 110 is shown in a layer of the electrolyte 106-A. The pressure caused by the gas 110 causes the electrolyte 106-A, adjacent electrodes 102-A, 104-A, electrolyte 106-B, and the enclosure 108 to deform. In addition to the increase of pressure within the enclosure 108 potentially causing the enclosure 108 to rupture and terminally damage the battery 100, the deformation caused by the generated gas 110 will reduce the performance of the battery 100 due to the loss of proper orientation/spacing between the anode, cathode, and electrolyte layers.

Conventional solutions to alleviate the affects of increased gas pressure include designing the battery package with a weak point or a vent that will break open in response to an increase of pressure beyond a predetermined threshold. The battery is thereby prevented from bursting by releasing the internal pressure to the ambient surroundings through the breakage. Although this solution may result in the cell not bursting, the cell may be terminally damaged and may leak through the breakage.

The generation of gas is characteristic of rechargeable lithium/lithium ion/lithium ion polymer cells/batteries. Gas is usually formed during the first charge cycle (often called the formation cycle) and to a lesser degree for many cycles thereafter. To compensate for this generated gas, flat cells are generally reopened and degassed after the first charge cycle. Wound cells in metal cans are generally not degassed after formation as the metal case is less affected by the resultant pressure. Even after degassing, on continued cycling and/or standing, a certain amount of gas (either from electrochemical reaction or migration of moisture and/or oxygen through the seals, or chemical reaction with said moisture or oxygen) will accumulate within the package.

In addition to the seal, it is also desirable to keep cell electrodes in close proximity to each other for good performance. In polymer cells, this is generally achieved by laminating the electrodes to the separator to form a self-adhering composite. Liquid cells are generally wound wherein the winding holds the layers together. Liquid cells may also be fabricated with flat electrodes that are clamped between two plates to hold the layers together. Lithium metal cells can be fabricated by any of the above techniques.

However, rigid restraints such as clamping arrangements are inflexible with regard to manufacturing variations. For example, FIG. 2 is a cross-sectional diagram of a portion of a conventional battery 200. The coatings 202 and separators 204 are clamped between two plates 206. In this case, the coatings 202 have a non-uniform thickness due to manufacturing variations. The inflexibility of the clamping arrangement causes a greater pressure at the thick spots 208 in the coatings 202 which causes a corresponding variation in thickness of the separator 204. Variations in separator thickness result in corresponding changes in ionic resistance, thereby reducing performance.

Battery packaging requirements and the difficulty in maintaining the seal have resulted in battery manufacturers compromising between battery performance and packaging flexibility. On the one hand, a battery with a liquid or gel electrolyte generally has a higher power density, greater cell life, and costs less. However, such batteries are manufactured with a rigid and substantial package to hold the electrodes together, usually by winding. On the other hand, batteries with a polymer-based electrolyte can be manufactured in a thin flat format using a flexible foil package.

There is a need for an improved battery package system that alleviates the performance-deteriorating affects of increased pressure without permanently damaging the battery to allow the manufacture of a high capacity battery in a flexible package.

SUMMARY OF THE INVENTION

In one aspect, the invention comprises an electrochemical device having an electrochemical cell located within the sealed first enclosure. The first enclosure has at least a portion that is flexible. A cavity is formed within the first enclosure so that the cavity is in fluidic communication with the electrochemical cell, and pressure inside the sealed first enclosure is less than one half pressure of pressure outside the sealed first enclosure.

In another aspect, the flexible portion of the first enclosure is adjacent to a surface of the electrochemical cell and is responsive to a pressure difference between pressure inside the first enclosure and pressure outside the first enclosure so that a greater pressure outside the first enclosure results in the first enclosure transmitting a force to the surface of the electrochemical cell.

In another aspect, the electrochemical device further comprises a cavity structure for forming the cavity within the first enclosure.

In another aspect, the electrochemical device comprises one of a capacitor, a battery, and a fuel cell.

In another aspect, an electrochemical device comprises a plurality of electrochemical cells located within respective sealed first enclosures. The sealed first enclosures are located within a sealed second enclosure. A cavity is formed either within the first enclosures, within the second enclosure, or both.

In another aspect, an electrochemical device is formed by placing an electrochemical cell and a cavity structure having a cavity therein within an enclosure. The enclosure is evacuated and then substantially sealed.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1A:
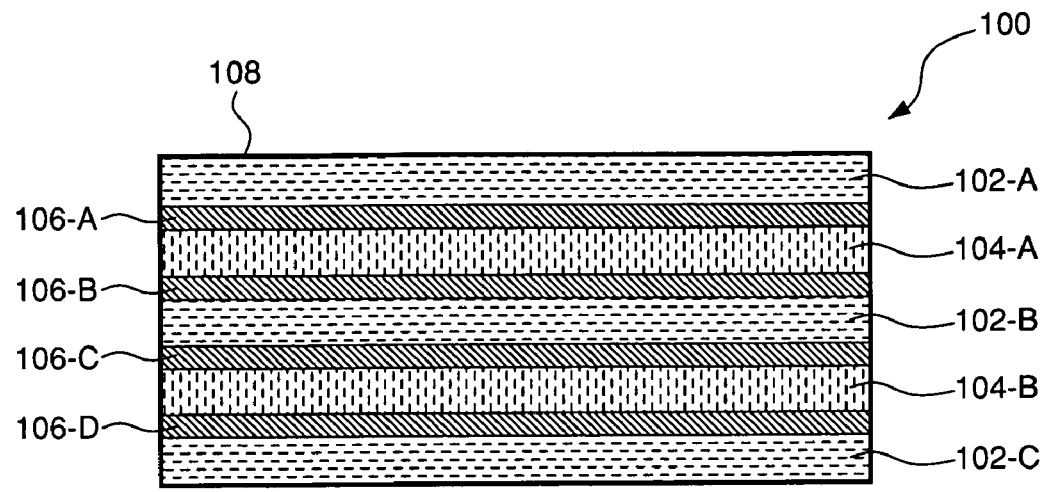
FIG. 1A is a cross-sectional diagram of a portion of a conventional stacked, multi-electrode flat cell.
Figure 1B:
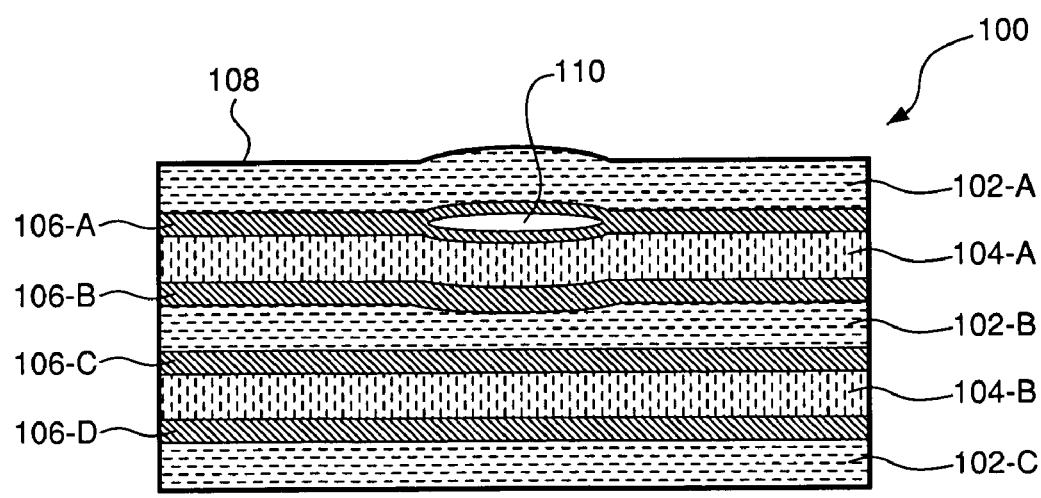
FIG. 1B is a cross-sectional diagram of a portion of the stacked, multi-electrode flat cell of FIG. 1 where the cell is deformed due to internal pressure caused by the generation of gas.
Figure 2:
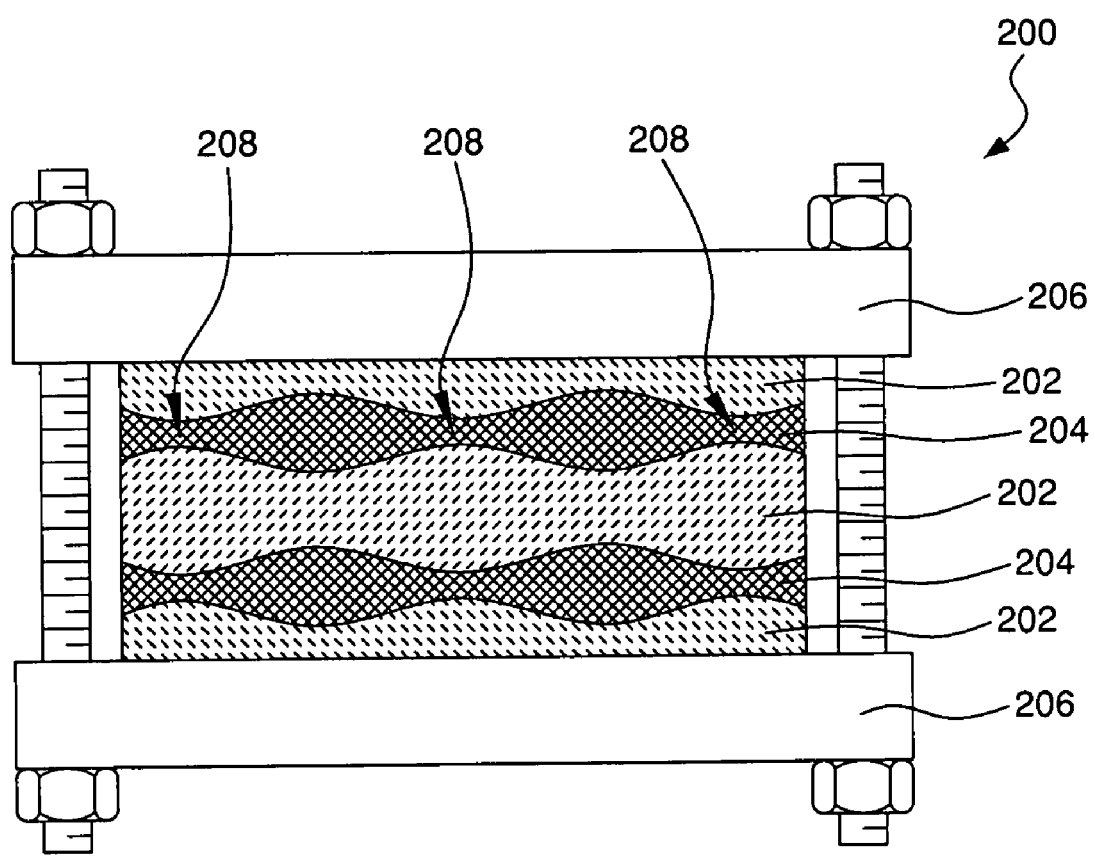
FIG. 2 is a cross-sectional diagram of a portion of a clamped battery that is mechanically restrained using end plates and tie rods.
Figure 3A:
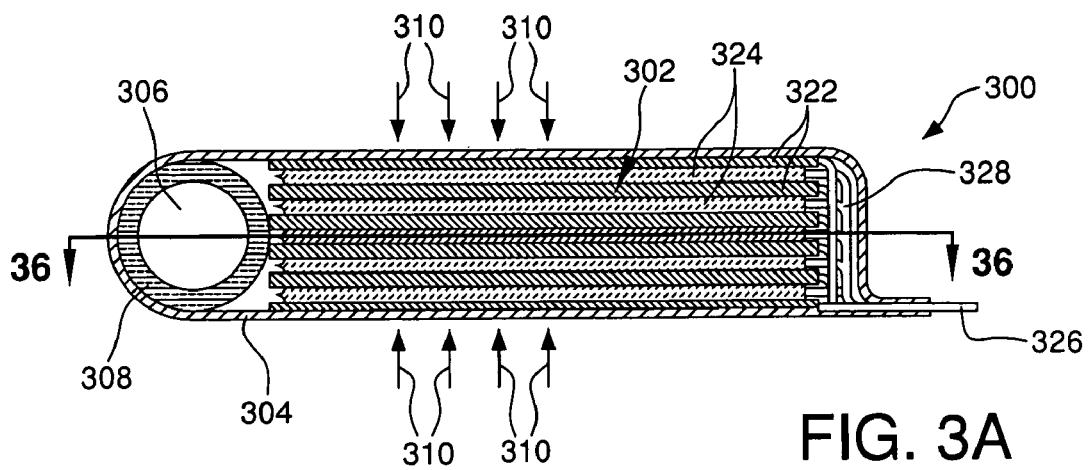
FIG. 3A is a cross-sectional diagram of a portion of an electrochemical device according to the present invention that includes a cavity structure within the enclosure.
Figure 3B:
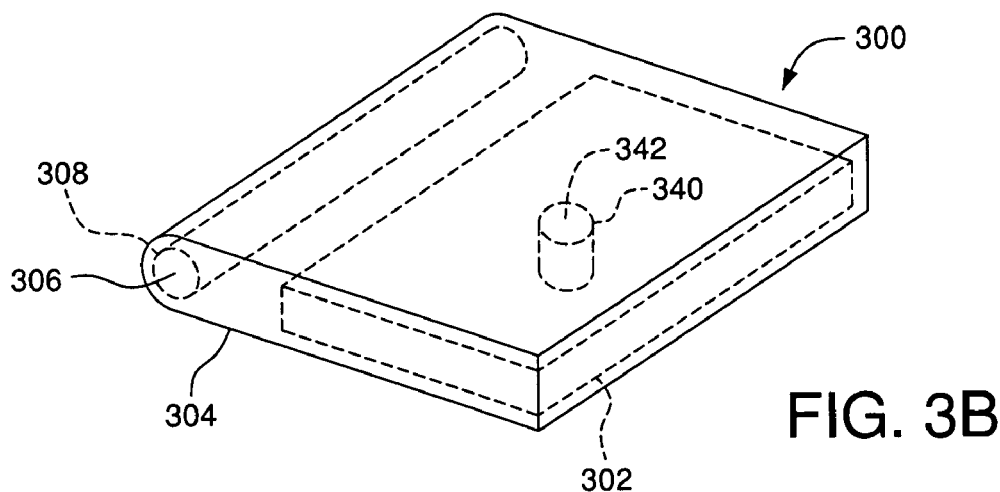
FIG. 3B is an isometric view of the electrochemical device shown in FIG. 3A.
Figure 3C:
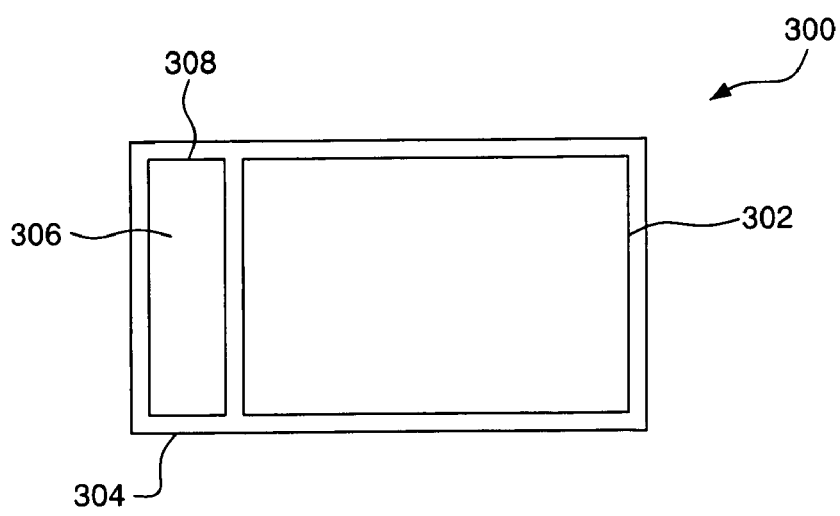
FIG. 3C is an cross-sectional view of the electrochemical device cell shown in FIG. 3A taken along line 3C—3C in FIG. 3A.

Referring to the drawings in which like reference numerals indicate like elements, there is shown in FIGS. 3A–C an electrochemical device 300 according to an exemplary embodiment of the present invention. The electrochemical device 300 includes an electrochemical cell 302 and a cavity structure 308 contained within an enclosure 304.

The electrochemical cell 302 and the cavity structure 308 with its cavity 306 are substantially sealed within the enclosure 304 to prevent the electrochemical cell 302 from leaking and to prevent outside contaminants from entering the enclosure 304 and interacting with the electrochemical cell 302. The term "sealed" is used herein with regard to a package or enclosure to designate that it is either entirely or substantially impervious to the migration of water, oxygen, etc. between the inside and outside of the enclosure.

In an exemplary embodiment, the enclosure 304 comprises a multi-layer material such as a metal foil coated with a heat-sealable layer. Such enclosure materials are available from the Dai Nippon Printing Co., Ltd. (DNP) in Tokyo, Japan. The inside of the enclosure 304, including the cavity 306, is evacuated during the sealing process to remove any contaminants. The electrochemical device 300 may be sealed by the enclosure 304 in accordance with the teachings of U.S. Pat. No. 5,057,385, the entire disclosure of which is incorporated herein by reference.

The term "electrochemical cell" as used herein is defined as at least two electrodes separated by an electrolyte. The teachings of the present invention are applicable to a plurality of forms of electrochemical cells including but not limited to fuel cells, capacitors, and battery cells.

In this exemplary embodiment, the electrochemical cell 302 includes multiple layers of anodes 322 and cathodes 324 separated by an electrolyte (not shown) and coupled by current collectors 328 to terminals 326 external to the enclosure 304. The cavity structure 308 forms a cavity 306 that serves as a reservoir inside of the enclosure 304, that is, a space to accumulate residual gas that evolves during the cycling of the electrochemical cell 302. The cavity 306 is in fluidic communication with at least a portion of the electrochemical cell 302 so that gas formed during operation of the electrochemical cell 302 may flow into the cavity 306.

In an exemplary embodiment, in addition to or instead of having a cavity structure, the electrochemical cell 302 comprises rigid components formed in spaced relation to each other for forming a cavity therebetween. For example, with reference to FIG. 3B, one or more voids or holes 340 may be formed in the stacks comprising an exemplary electrochemical cell 302 for forming the cavity 342 therebetween.

As gas accumulates with the electrochemical device 300, such as by diffusion through the package seals or by generation of gas during operation of the electrochemical cell 302, the cavity 306 serves as a reservoir inside of the enclosure 304 for accumulating the generated gas. Instead of the gas accumulating within and distorting the electrochemical cell 302 which would deteriorate its performance, the gas transfers from within the electrochemical cell 302 into the cavity 306 to reduce deformation of the electrochemical cell 302 and of the enclosure 304. This results in better performance of a cell according to the present invention in comparison to a conventional cell because proper orientation/spacing between the anode, cathode, and electrolyte layers is maintained.

An electrochemical device 300 according to the present invention may be formed by evacuating and sealing the enclosure 304 and then charging the electrochemical cell 302. Typically, the electrochemical cell 302 is charged and discharged several times during preparation. This charging/discharging typically results in the electrochemical cell 302 producing gas. The enclosure 304 is then typically opened, degassed to remove any gas produced by the electrochemical cell 302, and then resealed. If the electrochemical device 300 includes a sufficiently large cavity 306, the manufacture of a electrochemical device 300 may be simplified by eliminating the need to degas the enclosure 304 before sealing the enclosure 304.

As shown in FIGS. 3A–C, the enclosure 304 is adjacent to the electrochemical cell 302. At least a portion of the enclosure 304 is flexible such that it moves in response to changes in the pressure differential between the inside and outside of the enclosure 304. When the pressure outside the enclosure 304 is greater than the pressure inside the enclosure 304, the enclosure 304 transmits a corresponding force to the electrochemical cell 302 as illustrated by the arrows 310 in FIG. 3A. Since the enclosure 304 is evacuated, atmospheric pressure on the flexible portion of the enclosure 304 provides that force. By accumulating generated gas, the cavity 306 reduces the magnitude of increases in internal pressure resulting from the generation of gas.

Preferably, the cavity 306 has a volume that is larger than the volume of gas generated by the electrochemical cell 302 so there is not a significant change in pressure within the enclosure 304 due to the gas generated in accordance with the ideal gas law ($pV=nRT$). This maintains the external pressure forces 310, thereby holding the elements of the electrochemical cell 302 in close proximity of each other. The necessary volume of the cavity 306 may be determined based on the total volume of the electrochemical cell (as calculated by length X width X thickness), the rate of leakage into the electrochemical device, the internal gas generation, and the desired life of the electrochemical device. In an exemplary embodiment, the volume of the cavity 306 is 0.5%–10% of the volume of the electrochemical cell. In another exemplary embodiment, the volume of the cavity ranges between 3–5% of the volume of the electrochemical cell. In yet another exemplary embodiment, the volume of the cavity is greater than 1% of the volume of the electrochemical cell. In some cases, it may be convenient to provide a cavity volume greater than 10% because the cavity 306 is formed by a space for making inter-connects.

Lithium ion batteries may be assembled in stacks. The stacks of a liquid lithium ion battery may be held in place by mechanical restraints such as a clamping arrangement with end plates and tie rods. The clamping arrangement rigidly restrains the stacks and is uncompromising with regard to manufacturing variations, such as variations in the thickness of coating applications, or to expansion/contraction of the electrodes. The inflexibility of the clamping arrangement causes a greater pressure at the thick spots in the coating or where there are surface defects in an electrode or debris in the assembly. The greater pressure may cause a breach in the separator under high localized pressure. Also, the mechanical restraints restrict the expansion/contraction of the stacks in response to the expansion/contraction of the electrode materials which results in internal pressure that causes a thinning of the separator and a corresponding change in ionic resistance, thereby reducing performance.

The atmospheric pressure exerted on the flexible enclosure 304 of the electrochemical device 300 applies a uniform fluidic pressure to the electrochemical cell 302 instead of the rigid mechanical restraint applied by a clamping arrangement that uses end plates and tie rods. This allows an electrochemical cell 302 in an electrochemical device 300 according to the present invention to expand and contract as the electrodes expand and contract, thereby avoiding thinning of the separator and its resulting performance-deteriorating affects.

Figure 3D:
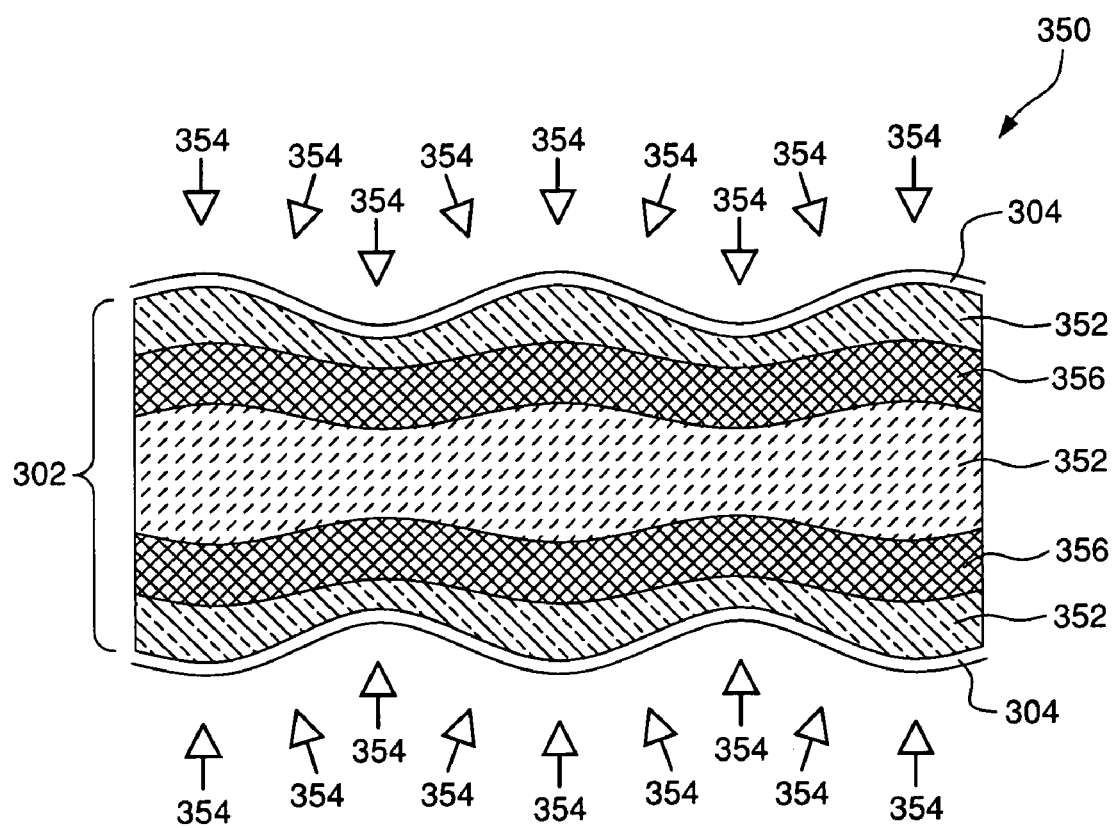
FIG. 3D is an cross-sectional view of an electrochemical device according to the present invention where the uniform fluidic pressure is applied over areas of non-uniform thickness.

The disclosed technique of using atmospheric or other fluidic pressure also maintains a uniform pressure over areas of non-uniform thickness, thereby avoiding points of high localized pressure and their resulting performance-deteriorating affects. FIG. 3D shows an electrochemical cell 350 according to the present invention with coatings 352 of non-uniform thickness. The greater pressure outside the flexible enclosure 304 transmits a corresponding force to the electrochemical cell 302 as illustrated by the arrows 354 in FIG. 3D. The flexible enclosure 304 allows the uniform force the flexible enclosure 304 to maintain a substantially uniform thickness of the separator 356 despite variations in coating thickness, thereby avoiding the performance-deteriorating affects of a non-uniform separator thickness.

Rechargeable lithium ion chemistries have the potential of continued gas generation with cycling. Further, heat-sealable foil packaging may allow a finite rate of migration of water and oxygen into the package through the polymeric seals. In time, one or both of these mechanisms may result in a loss of pressure in an evacuated flat non-clamped cell. The loss in external to internal pressure differential allows separation of the electrodes and a resultant deterioration in performance. An electrochemical device 300 according to the present invention is less susceptible to these increases in internal pressure due to the reservoir effect of the cavity 306. Thereby allowing to electrochemical cell 302 to operate at higher performance for a longer period of time The use of atmospheric pressure also improves the safety of liquid lithium ion electrochemical cells over those that are mechanically constrained by clamping or those that are spirally wound. Localized hot spots or shorts that are the result of electrode expansion during cycling, can lead to a runaway condition and a rapid, large increase in the internal gas pressure. In a mechanically restrained battery system, the localized hot spots are exacerbated by the mechanical restraints which do not allow the electrodes to separate. The resulting increased pressure generally leads to rupturing of the package and venting of the cells. In contrast, an electrochemical device 300 according to the present invention is less susceptible to catastrophic failure. When the pressure inside the package or enclosure 304 exceeds atmospheric pressure, the package begins to expand because it is flexible, to a degree. The electrodes then become free to separate, thereby reducing the pressure on the hot spot and allowing it to disconnect.

The present invention provides a flat electrochemical cell a cycle life and rate performance that is comparable to that of a wound (cylindrical or prismatic) electrochemical cell or to a mechanically constrained flat stack without their respective disadvantages. An electrochemical device according to the present invention may provide this improved performance in a flat package without the form factor limitations of a cylindrical or small prismatically wound cell and in a flexible package without the weight and volume limitations of mechanical restraints or clamps.

Figure 4A:
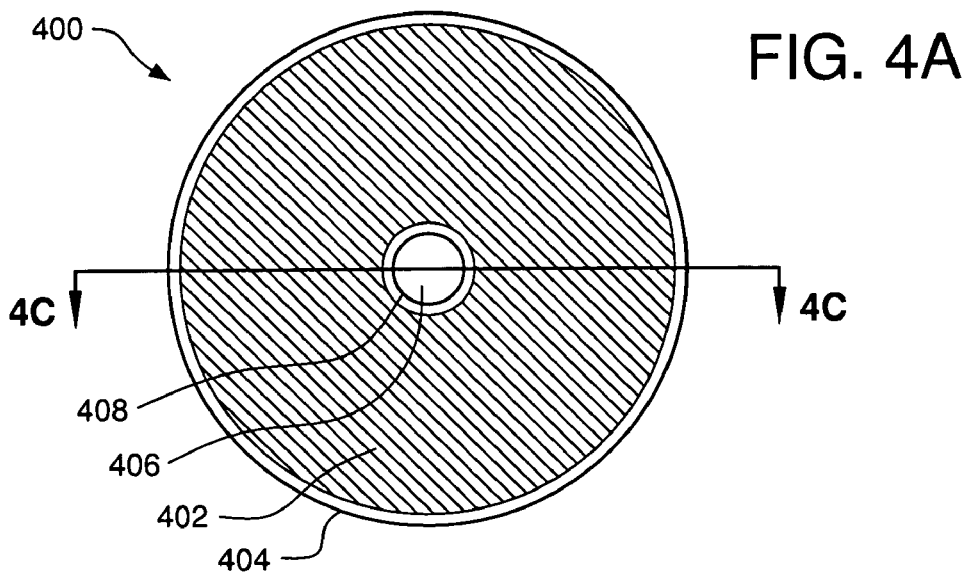
FIG. 4A is a cross-sectional view of a portion of an electrochemical device having a cylindrical cell according to the present invention that includes a cavity structure as the core or winding mandrel of the cylindrical cell.
Figure 4B:
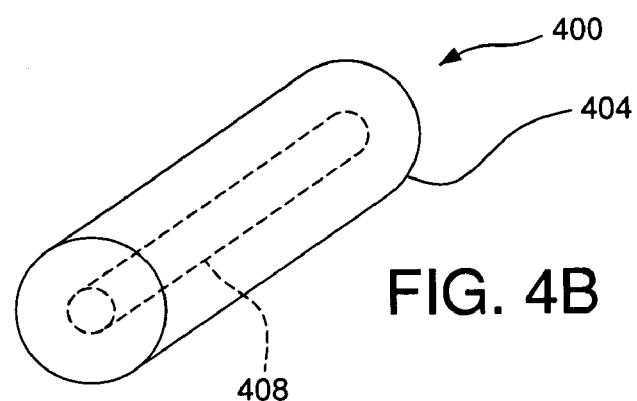
FIG. 4B is an isometric view of the electrochemical device shown in FIG. 4A.
Figure 4C:
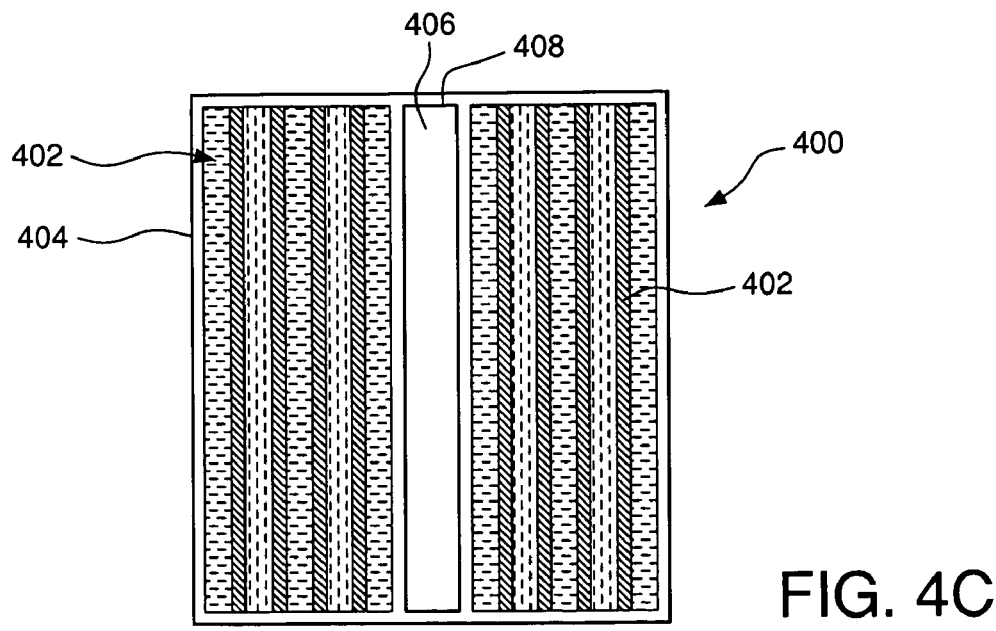
FIG. 4C is a cross-sectional view of the electrochemical device shown in FIG. 4A taken along line 4C—4C in FIG. 4A.

The present invention may be applied to electrochemical devices having electrochemical cells of various shapes. For example, an electrochemical device 400 comprising a cylindrical electrochemical cell 402 is illustrated in FIGS. 4A–C. The electrochemical device 400 includes a core structure 408 forming a cavity 406. The electrochemical cell 402 and the core 408 are sealed in an enclosure 404. The electrochemical device 400 is formed by wrapping the electrodes of the electrochemical cell 402 around the core 408. In this case, the core 408 is a hollow cylinder that forms the cavity structure of the electrochemical device 400. The cavity 406 accepts gas generated by the electrochemical cell 402.

The walls of the core 408 may be perforated to facilitate the transfer of gas from the electrochemical cell 402 into the cavity 406. Alternatively, the core of the electrochemical device 400 may be a porous rod around which the electrochemical cell is formed wherein gas formed by the electrochemical cell transfers into the pores of the rod.

Figure 5A:
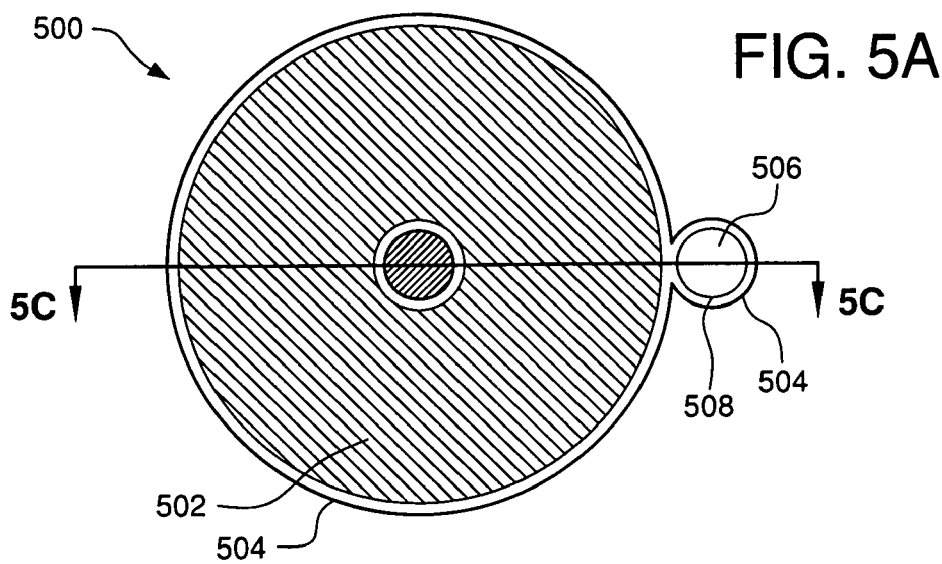
FIG. 5A is a cross-sectional view of a portion of an electrochemical device having a cylindrical cell according to the present invention that includes a cavity structure within the enclosure and external to the cylindrical cell.
Figure 5B:
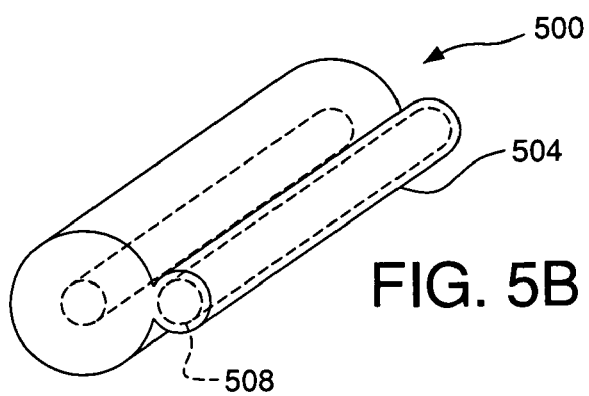
FIG. 5B is an isometric view of the electrochemical device shown in FIG. 5A.
Figure 5C:
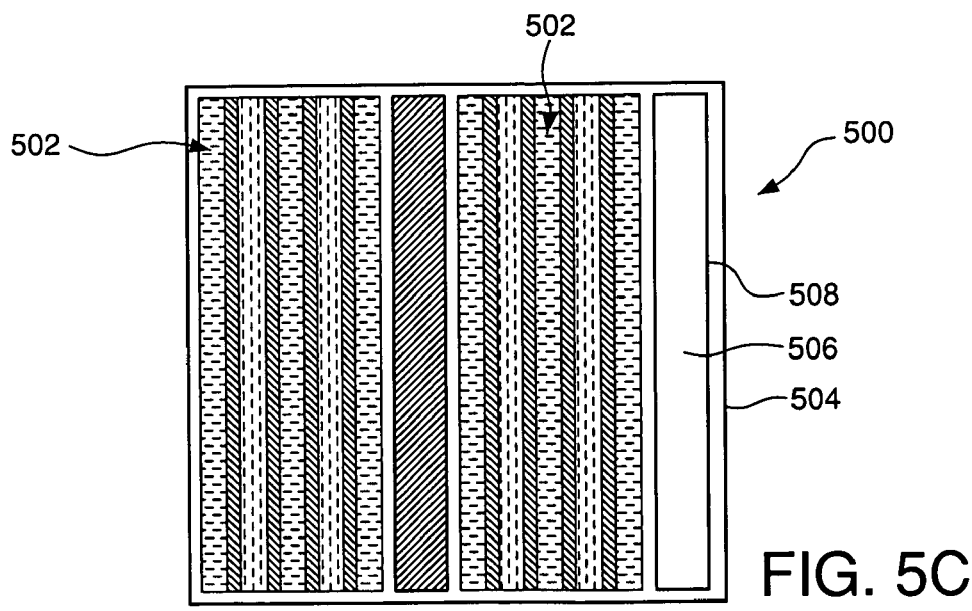
FIG. 5C is an cross-sectional view of the electrochemical device shown in FIG. 5A taken along line 5C—5C in FIG. 5A.

Alternatively, an electrochemical device 500 having a cylindrical electrochemical cell 502 may include a cavity structure 508 external to the electrochemical cell 502 as illustrated in FIGS. 5A–C. The cavity structure 508 is adjacent to and external to the electrochemical cell 502. The cavity structure 508 and the electrochemical cell 502 are sealed in an enclosure 504. The cavity structure 508 includes a cavity 506 in fluidic communication with the electrochemical cell 502. The cavity 506 is adapted for accumulating gas generated during operation of the electrochemical cell 502.

The present invention may be used to improve the performance of prismatic electrochemical devices. The windings of electrodes of conventional prismatic electrochemical devices experience a non-uniform compression force due to the winding of the electrodes around a flat mandrel. The winding tension causes a greater compressive normal force to be applied to the portions of the electrodes located at the ends of the prismatic electrochemical cell than that applied to the portions of the electrodes located at the top or bottom of the electrochemical cell. This non-uniform force results in a non-uniform separator thickness and a resulting decrease of performance, the affects of which increase with larger (flatter—higher width to thickness aspect ratio) prismatic electrochemical cells.

Figure 6A:
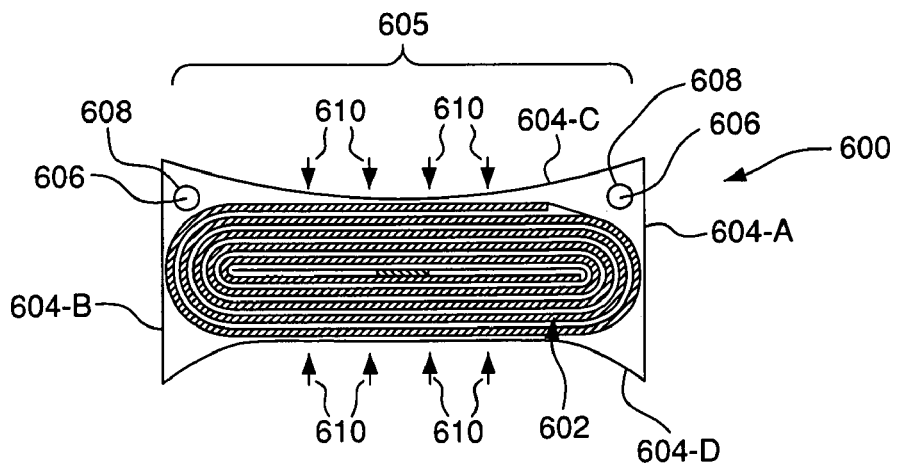
FIG. 6A is a cross-sectional view of a portion of an electrochemical device having a prismatic cell according to the present invention that includes a cavity structure.
Figure 6B:
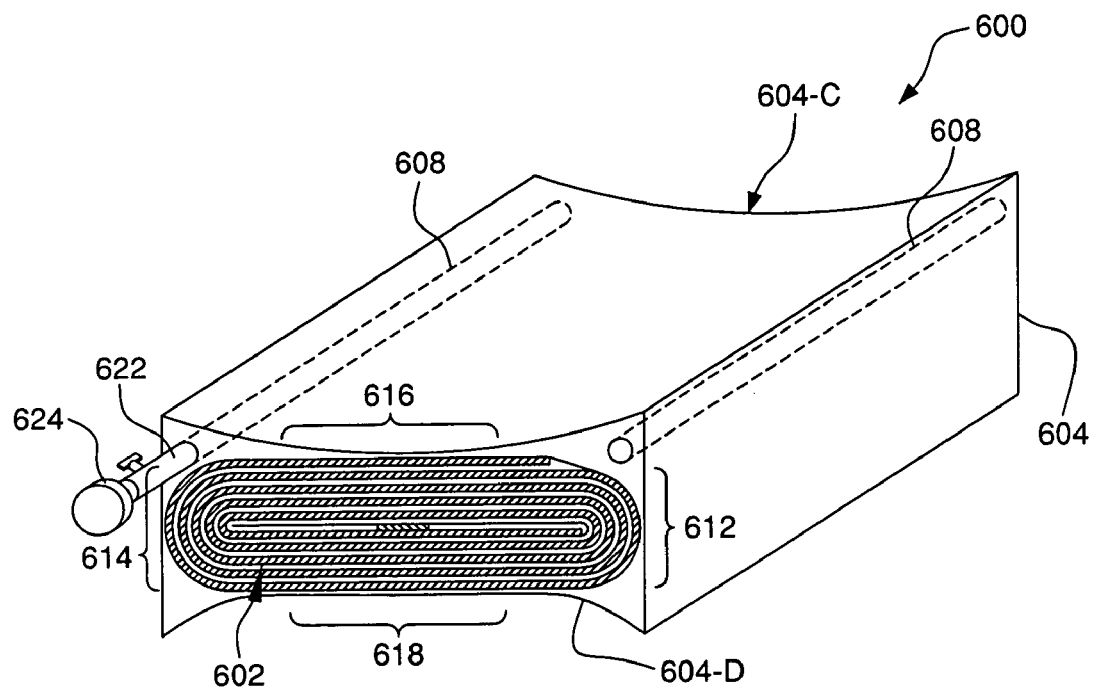
FIG. 6B is an isometric view of the electrochemical device shown in FIG. 6A.

FIGS. 6A–B illustrate another embodiment of the present invention applied to an electrochemical device 600 having a prismatic electrochemical cell 602 and a partially flexible enclosure 604. The electrochemical device 600 includes an electrochemical cell 602 and at least one cavity structure 608 sealed within the enclosure 604. The cavity structure 608 includes a cavity 606 for accumulating gas generated during operation of the electrochemical cell 602. The sides 604-A, 604-B of the enclosure 604 are rigid and the top 604-C and bottom 604-D of the enclosure 604 are flexible. The flexible portions 604-C, 604-D of the enclosure 604 are responsive to a difference between the pressure inside the enclosure 604 and the pressure outside the enclosure 604. During normal operation, the pressure outside the enclosure 604 is greater than the pressure inside the enclosure 604 due to atmospheric pressure. A force corresponding to this difference in pressure is transmitted by flexible portions 604-C, 604-D to the adjacent contents of the enclosure 604. In this case, the prismatic electrochemical cell 602 is positioned in proximity to the flexible portions 604-C, 604-D of the enclosure 604 so that this positive force, illustrated by arrows 610 in FIG. 6A, is transmitted to the top and bottom of the electrochemical cell 602.

The electrochemical device 600 of FIGS. 6A–B compensates for the non-uniform force by applying the force 610 to the top 616 and bottom 618 portions of the prismatic electrochemical cell 602 where the compression force due to the winding is less than that on the ends 612, 614 of the prismatic electrochemical cell 602. This creates a more uniform separator thickness throughout the electrochemical cell 602 which results in improved performance thereby allowing the construction of larger practical prismatic electrochemical cells than previously practical.

The cavity 606 may be formed in one or more of the corners of the prismatic electrochemical device 600 or in the core or winding mandrel of the prismatic electrochemical cell 602. The cavity 606 within electrochemical device 600 in FIGS. 6A–B does need to be formed using a separate distinct physical entity such as the cavity structure 608. For example, a cavity may be formed by the residual space created by filling the curved perimeter of the prismatic winding 602 into the square corner of the enclosure 604 having rigid sides 604-A,B.

In the exemplary embodiment shown in FIGS. 6A–B, the electrochemical device 600 further comprises a valve 622 and a fitting 624 coupled to the cavity 606 through the enclosure 604. Gas may accumulate in the cavity 606 during operation of the electrochemical cell 602. The accumulating gas may reduce the difference between the pressure inside the enclosure 604 and the pressure outside the enclosure 604. The original difference in pressure may be restored by coupling the fitting 624 to a vacuum pump and opening the valve 622 to evacuate gas that has accumulated in the cavity 606. The valve 622 may then be closed and the vacuum pump removed for continued operation of the electrochemical cell 602.

Figure 7:
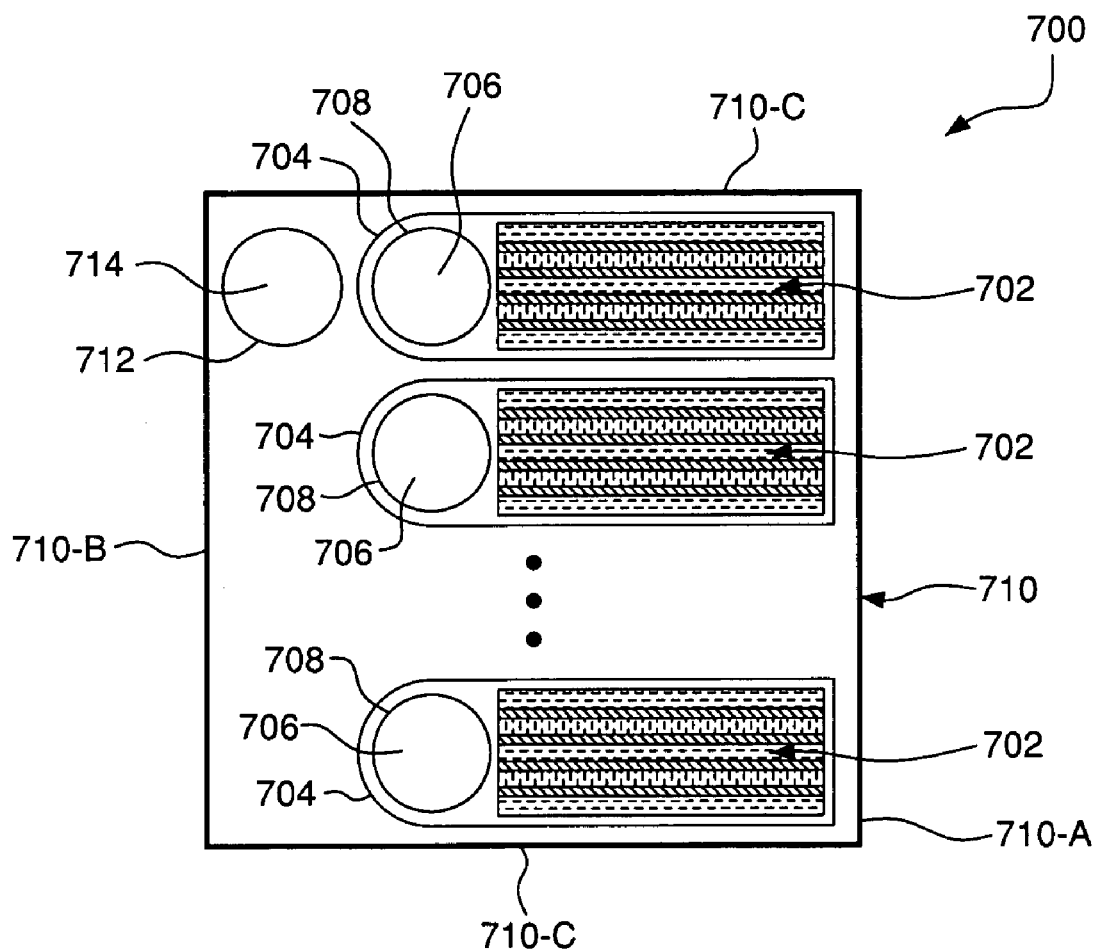
FIG. 7 is a cross-sectional view of a portion of an electrochemical device according to the present invention.

A plurality of electrochemical cells may be electrically coupled to each other in a series and/or parallel configuration within a surrounding enclosure. Accordingly, an electrochemical device 700 according to the present invention may include a plurality of separate electrochemical cells 702 as illustrated in FIG. 7. Each electrochemical cell 702 is sealed within a separate enclosure 704 along with a corresponding cavity structure 708 having a cavity 706 therein. The plurality of separate enclosures 704 are enclosed within an outer enclosure 710. The enclosure 710 has rigid sides 710-A, 710-B and flexible faces 710-C, 710D. The electrochemical device 700 is constructed such that the flexible faces 710-C, 710-D of the enclosure are in contact with the flexible enclosures 704 of the individual elements 702, so that when the enclosure 710 is evacuated, the atmospheric pressure is transmitted to the stack of elements 702. One or more outer cavity structures 712 having a outer cavity 714 therein may be contained within the outer enclosure 710 to serve as vacuum reservoirs to maintain atmospheric pressure on the individual electrochemical cells 702.

The practice of the invention has been illustrated by cavity structures in the form of tubes or similar cylindrical structures. It may be appreciated that the cavity structure may comprise a variety of other shapes such as rectangles, spheres, squares, and the like, so long as they provide an enclosed space which is in communication with at least a portion of an electrochemical cell, which enclosed space may function as a sump for gas which may be given off by the electrochemical cell. The enclosed space functions to maintain the pressure differential between the inside and outside of the enclosed space to maintain atmospheric fluidic pressure on the surfaces of the electrode stack(s). Fluidic communication may be provided by pores, channels, perforations or other openings in the cavity structure.

Figure 8:
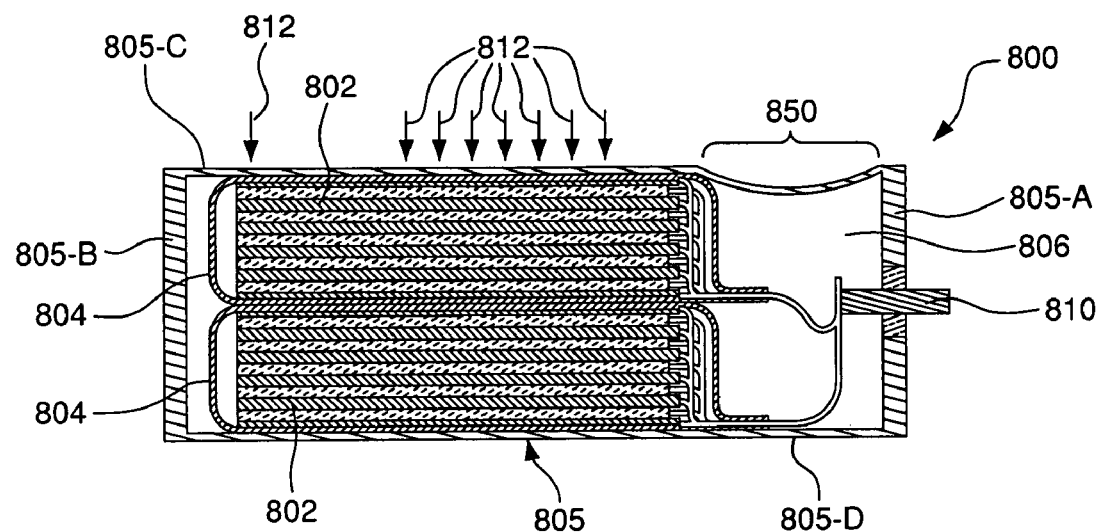
FIG. 8 is a cross-sectional view of a portion of an electrochemical device according to the present invention.

As shown in FIG. 8, a cavity 806 may be created in an electrochemical device 800 without a cavity structure. The electrochemical device 800 includes two electrochemical cells 802, each within a respective first enclosure 804. The first enclosures 804 are within a sealed second outer enclosure 805. The second enclosure 805 includes rigid sides 805-A, 805-B and bottom 805-D and a flexible top 805-D.

A cavity 806 is formed in a gap 850 between at least one of the sides 804-A, 804-B and the electrochemical cell 802 or stack. The gap 850 may be formed, for example, in a space for making feed thru connections between the electrochemical cells 802 and terminals 810 of the electrochemical device 800.

A flexible portion 805-C of the enclosure is positioned across the gap 850 so that it is depressed inward as a result of the evacuation of the enclosure in a vacuum environment (i.e. the pressure outside the enclosure 805 is greater than the pressure inside the enclosure 805). During operation of the electrochemical device 800, the greater pressure outside the second enclosure 805 causes the flexible portion of the enclosure 805-C to apply a uniform force, as illustrated by arrows 812, to a surface of the electrochemical cell 802 (through its respective first enclosure).

Figure 9:
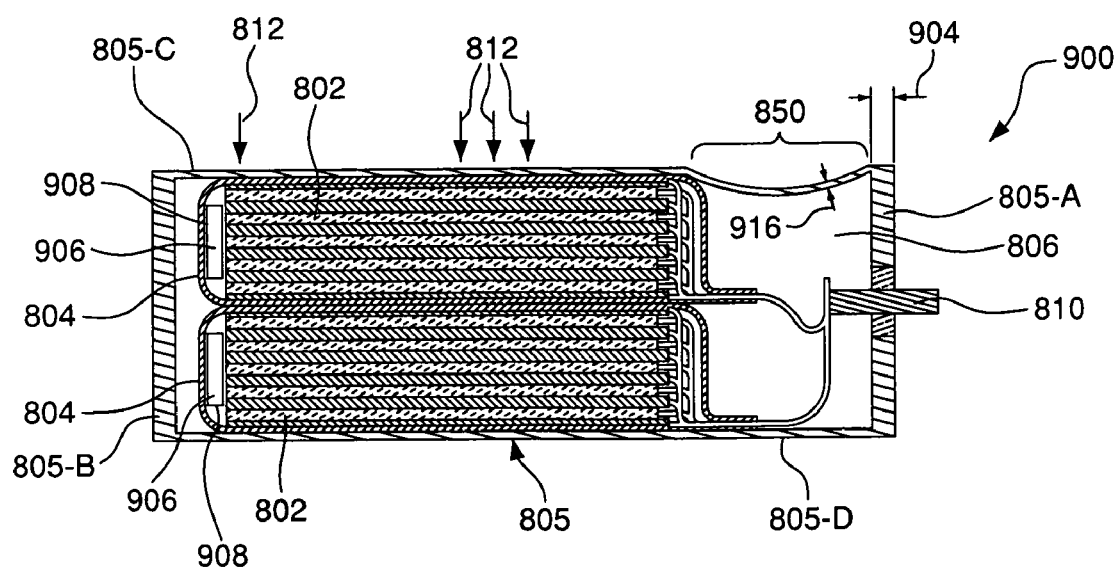
FIG. 9 is a cross-sectional view of a portion of an electrochemical device according to the present invention.

FIG. 9 shows an electrochemical device 900 similar to that shown in FIG. 8, with the addition of a cavity structure 908 for forming a cavity 906 within each first enclosure. The cavities 906 are in fluidic communication with the electrochemical cells 802 and adapted for accumulating gas generated by the electrochemical cells 802 during their operation.

The second enclosure 805 may be formed of metal. The sidewalls 805-A, 805-B may have a thickness 904 greater than the thickness 916 of the top 805-C of the second enclosure 805. The thicker sidewalls 805-A, 805-B remain rigid while the thinner top 805-C is flexible to so that it is depressed inward by the pressure from the evacuation of the enclosure in a vacuum environment.

Although the present invention has been described with reference to particular embodiments where a force is applied by atmospheric pressure, the pressure outside an enclosure of an electrochemical device may result from other than atmospheric pressure. For example, an electrochemical device according to the present invention may comprise an electrochemical cell in a first enclosure having a flexible portion thereof. The first enclosure is placed within a second enclosure. The second enclosure is positively pressurized. The pressure within the second enclosure applies a force, through the flexible portion of the first enclosure, against the electrochemical cell within the first enclosure. The force will then be applied to the electrochemical cell even if there is less than atmospheric pressure outside the second enclosure as may be encountered in space applications.

Although the present invention has been described with reference to particular embodiments of the cavity structure, the cavity structure may be any member (hollow, porous, or otherwise) that keeps the flexible enclosure spaced apart to create a void into which gas generated by the electrochemical cell or migrated into the enclosure may accumulate. The cavity structure need not be a separate element and may be integral with the enclosure as illustrated in FIG. 8 above.

In an exemplary embodiment, the cavity is at least partially filled with a material that reacts with gas or material generated by the electrochemical cell or that migrated into the enclosure. In one example, the cavity may be at least partially filled with a silica gel to absorb moisture that migrates into the enclosure. In another example, the cavity may be at least partially filled with a Calcium Gluconate gel that will react with and neutralize hydrofluoric acid (HF) generated by the electrochemical cell.

The practice of the invention is illustrated by the following non-limiting examples wherein the electrochemical cell is a battery cell comprising a lithium salt.

EXAMPLE 1

A liquid lithium ion electrode pair was constructed by taking 100 mm×100 mm electrodes cast from solution to provide a coating with a total equivalent capacity of about 150 mAhr. The battery cell was activated in an argon-filled glove box by first applying electrolyte to the surface of one of the electrodes until the coating appeared wet. An oversized layer of a polyolefin membrane Celgard® was then laid over the surface and spread out to insure that the air contained within was displaced by the electrolyte and extra electrolyte was added as necessary. The second electrode was similarly wet with electrolyte and then positioned over the polyolefin membrane. The battery cell was then inserted into an enclosure made of a Dai Nippon Printing Co. Ltd. packaging material. A ¼" diameter polypropylene tube, open at both ends and having a length of approximately 100 mm was placed inside of the package along one edge of the package to form a vacuum reservoir. The enclosure was then sealed under vacuum using an Audionvox machine. A control cell was prepared in a similar manner except that a tube was not inserted into the enclosure of the control system.

The curves in FIG. 9 illustrate the improved performance of the cell according to Example 1 that includes the vacuum reservoir as compared to the control cell without the reservoir. The two top curves illustrate the capacity in Dmahrs (discharging milli-ampere hours) of the battery cells with (-■-) and without (-●-) the vacuum reservoir. Both battery systems initially had a capacity of about 180 Dmahrs. After 80 charge/discharge cycles, the battery system containing the vacuum reservoir had a capacity of approximately 175 Dmahrs. The battery system without the reservoir had a capacity of approximately 155 Dmahrs.

The two bottom curves in FIG. 9 show the internal resistance (in ohms) of the battery cells with (-■-) and without (-●-) the vacuum reservoir. The battery system including the reservoir initially had an internal resistance of about 70–80 milliohms and after 80 charge/discharge cycles had an internal resistance of about 80 milliohms. In contrast, the control system lacking the reservoir initially had an internal resistance of about 85–90 milliohms and after 80 charge/discharge cycles had an internal resistance of approximately 120 milliohms. Thus, the capacity of the battery system that included the vacuum reservoir decreased less with use in comparison to the control system and its resistance increased less with use in comparison to the control system.

EXAMPLE 2

Figure 10:
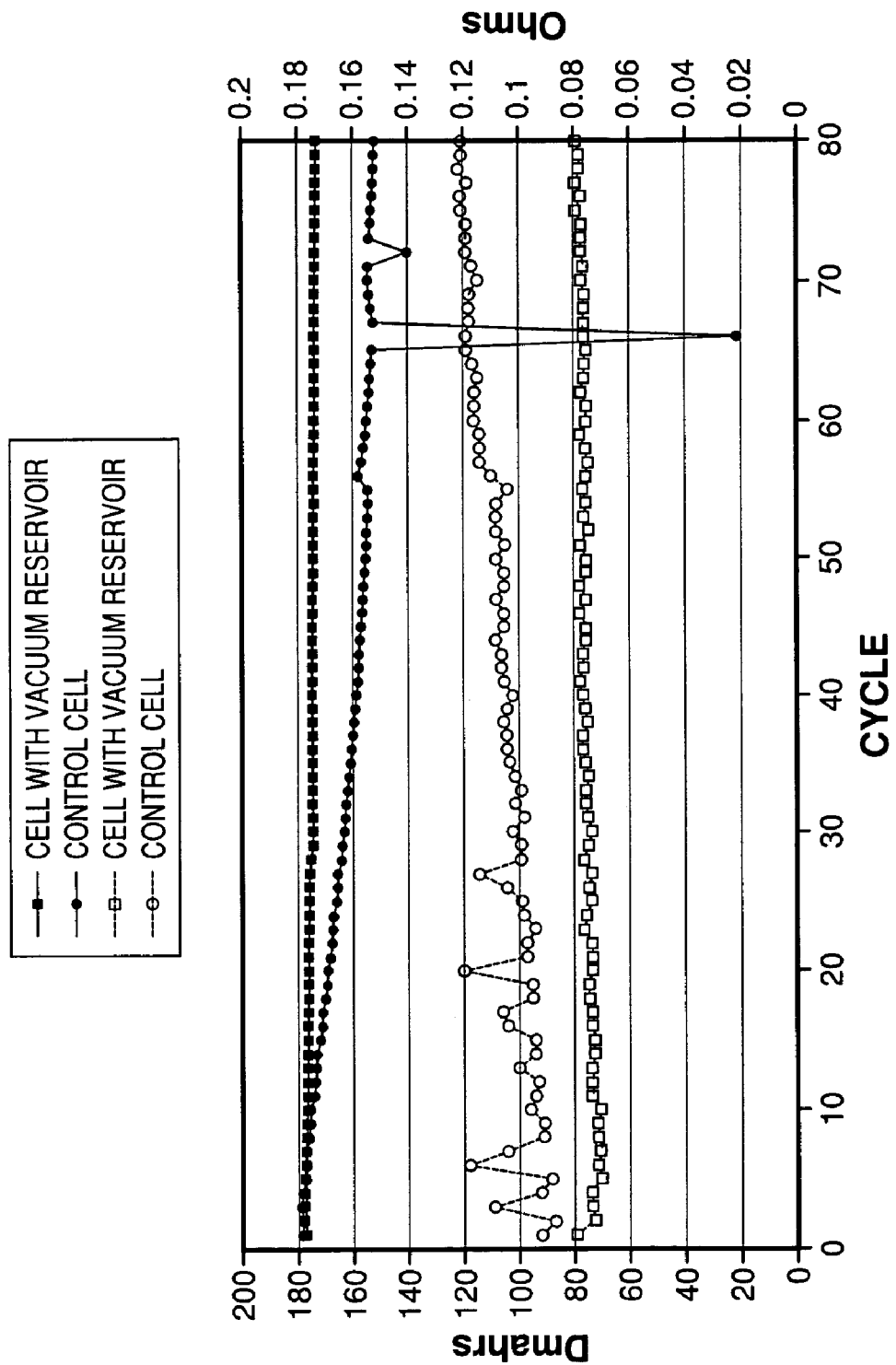
FIG. 10 is a plot illustrating the capacity and internal resistance of a electrochemical device comprising a battery cell according to the present invention in comparison to that of a conventional cell.

A battery system similar to the control system of Example 1 was constructed. With reference to FIG. 10, the capacity of the battery system is illustrated by the top curve showing the discharging (-♦-) and the charging (-▲-) of the battery system in milli-ampere hours (mAhrs). Internal resistance is illustrated by bottom curve (-■-). The battery system was cycled for 98 cycles during which it showed a severe loss in capacity. After 98 cycles, the battery system's capacity had dropped from its initial value of approximately 140 mAhrs to less then 90 mAhrs and its internal resistance increased from its initial value of approximately 40 milliohms to approximately 70 millliohms. The enclosure of the battery system was then opened and a polypropylene tube was inserted to create a vacuum reservoir. The enclosure was then re-evacuated and re-sealed. As shown in FIG. 10, by adding the vacuum reservoir and resealing the enclosure, the battery system nearly regained its original capacity and its internal resistance thereafter remained relatively constant. This improvement is afforded by the atmospheric pressure on the cell, holding the electrodes in close proximity. It is well known that distance between electrodes is critical. Re-evacuating the enclosure brings the performance back. However, due to either gas generation or gas migration through the package seals or both, without the vacuum reservoir, the cell will not hold the necessary degree of vacuum for the necessary atmospheric pressure to maintain cell performance.

EXAMPLE 3

Figure 11:
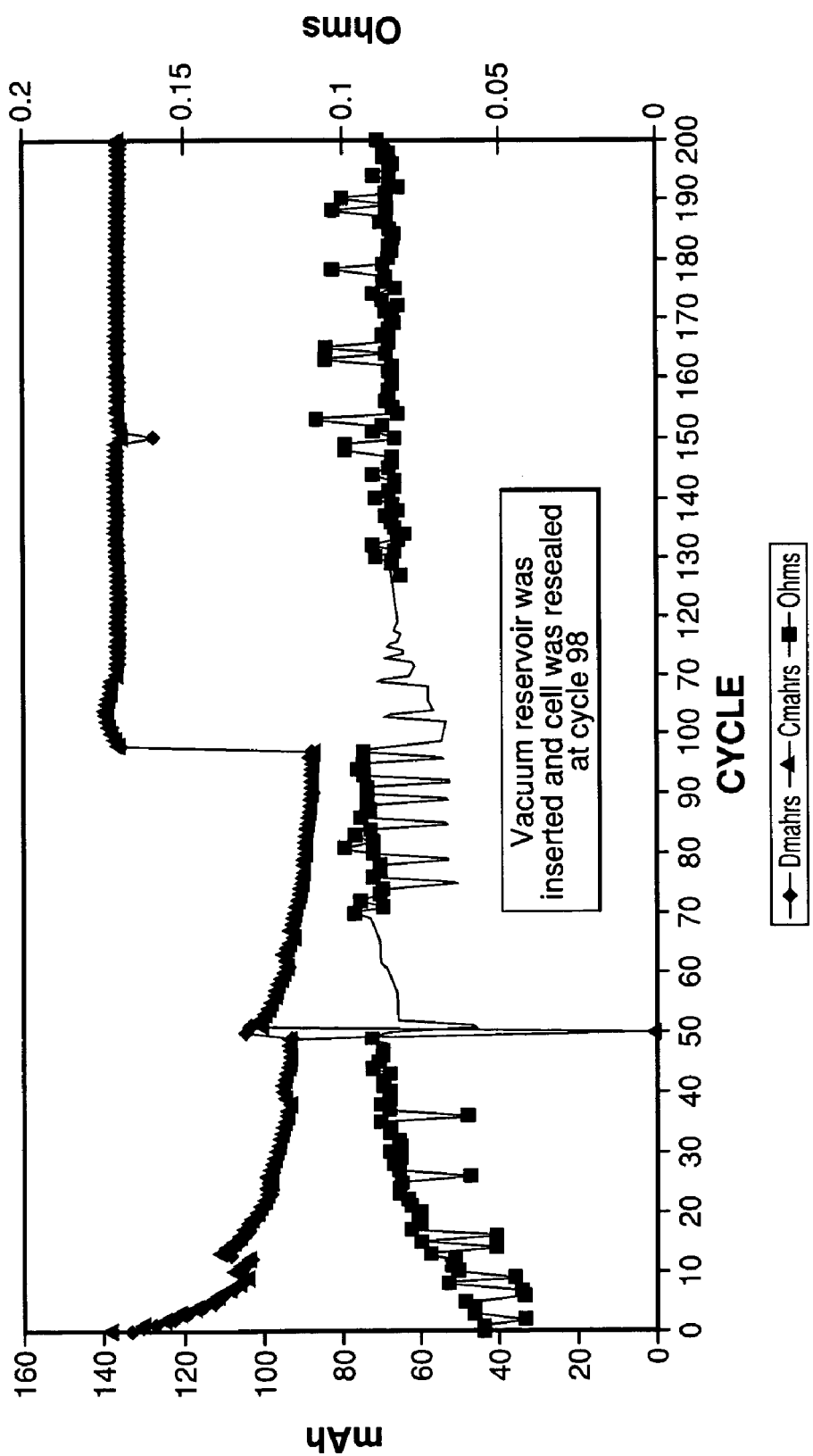
FIG. 11 is a plot illustrating the capacity and internal resistance of a conventional electrochemical device comprising a conventional battery cell that was converted to a electrochemical device comprising a battery cell according to the present invention after the ninety-eighth charge/discharge cycle.
Figure 12:
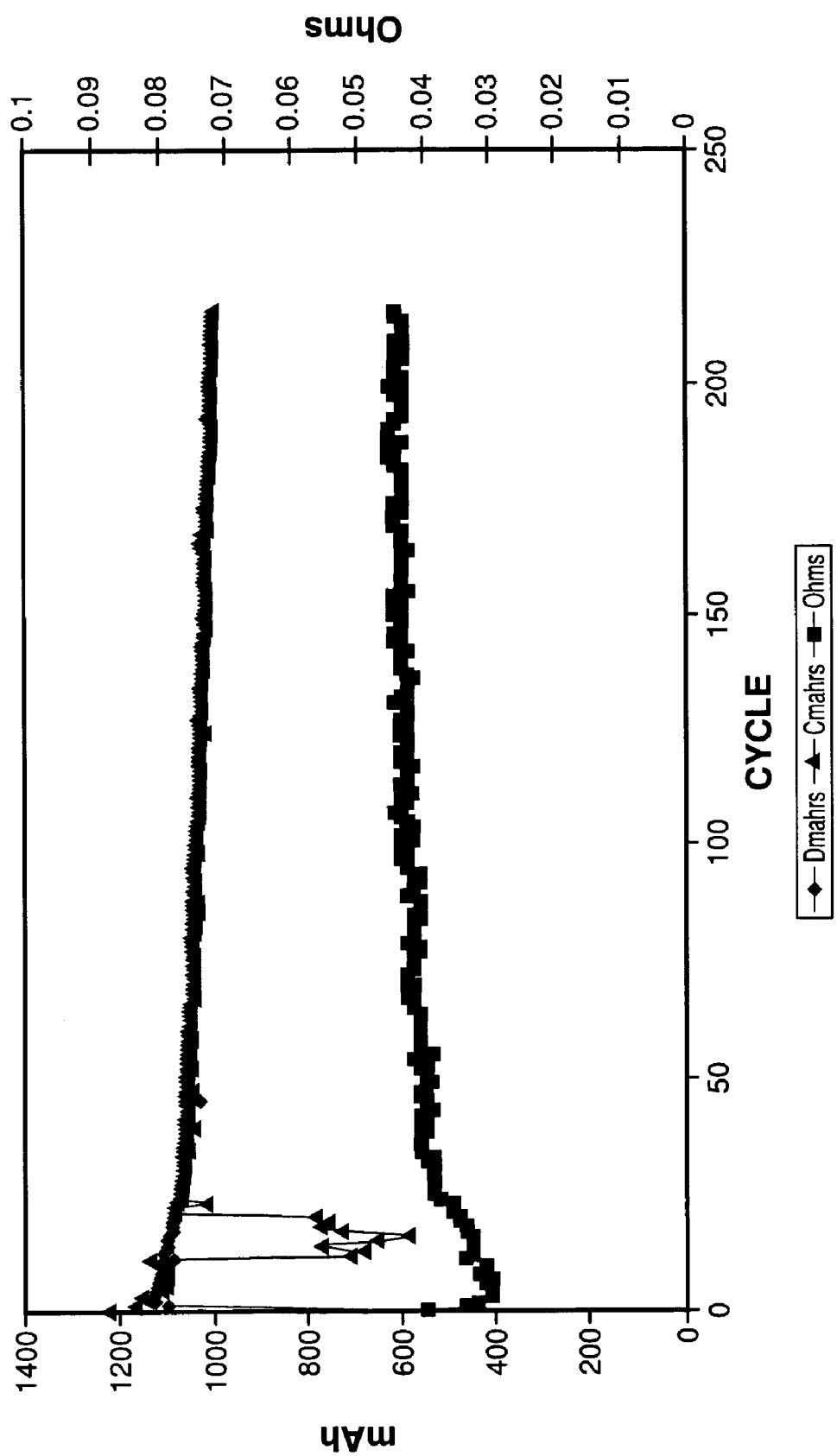
FIG. 12 is a plot illustrating the capacity and internal resistance of a electrochemical device comprising a battery cell according to the present invention.

A 100×200 mm bicell was constructed from two single-sided lithium ion cathodes and one centrally-positioned double-sided lithium ion anode. The battery cell was activated as described in Example 1. A frame of polypropylene channel similar to that used for presentation binders was assembled around the perimeter of the battery cell, encasing its edges. The assembly of the channels and the battery cell were then overwrapped with an enclosure comprising DNP 'soft' packaging material which was then evacuated and sealed. The performance of the battery system is shown in FIG. 11. The top curve illustrates the capacity of the battery system showing the discharging (-♦-) and the charging (-▲-) of the battery system in milli-ampere hours (mAhrs) which remained relatively constant over more than 200 charge/discharge cycles. The bottom curve (-■-) illustrates the internal resistance of the battery system which remained relatively constant over the same charge/discharge cycles.

The foregoing describes the invention in terms of embodiments foreseen by the inventors for which an enabling description was available, although insubstantial modifications of the invention, not presently foreseen, may nonetheless represent equivalents thereto.

What is claimed is:

1. An electrochemical device comprising:
   a. a sealed first enclosure having at least a portion that is flexible; and
   b. an electrochemical cell located within the first enclosure, wherein a cavity is formed within the first enclosure so that the cavity is in fluidic communication with the electrochemical cell, and pressure inside the sealed first enclosure is less than one half the pressure outside the sealed first enclosure.

2. The electrochemical device according to claim 1 wherein the inside pressure is less than one tenth of the outside pressure.

3. The electrochemical device according to claim 1 wherein the flexible portion of the first enclosure is adjacent to a surface of the electrochemical cell and is responsive to a pressure difference between pressure inside the first enclosure and pressure outside the first enclosure so that a greater pressure outside the first enclosure results in the first enclosure transmitting a force to the surface of the electrochemical cell.

4. The electrochemical device according to claim 1 wherein the electrochemical cell has a volume, the cavity has a volume, and the cavity volume is 0.5% to 10% of the electrochemical cell volume.

5. The electrochemical device according to claim 4 wherein the cavity volume is 3.0% to 5.0% of the electrochemical cell volume.

6. An electrochemical device comprising:
   a. a sealed first enclosure having at least a portion that is flexible; and
   b. an electrochemical cell located within the first enclosure,
   wherein the electrochemical cell comprises a layered stack of a plurality of electrodes and an electrolyte between adjacent layers of the electrodes; and
   wherein a cavity is formed within the first enclosure so that the cavity is in fluidic communication with the electrochemical cell, and pressure inside the sealed first enclosure is less than one half the pressure outside the sealed first enclosure.

7. The electrochemical device according to claim 1 further comprising a cavity structure for forming the cavity within the first enclosure.

8. The electrochemical device according to claim 7 wherein the cavity structure comprises a porous material and the cavity is formed by the pores of the cavity structure.

9. The electrochemical device according to claim 6 wherein the first enclosure comprises a metal foil coated with a heat-sealable layer, the electrochemical cell is flat and comprises a liquid lithium ion electrolyte, and the cavity structure comprises a hollow tube.

10. The electrochemical device according to claim 1 wherein the first enclosure comprises a rigid portion for forming the cavity within the first enclosure.

11. The electrochemical device according to claim 1 wherein at least a portion of the electrochemical cell comprises rigid components formed in spaced relation to each other and the cavity is formed in the space between the rigid components.

12. The electrochemical device according to claim 1 wherein the entire first enclosure is flexible.

13. The electrochemical device according to claim 1 wherein the flexible portion of the first enclosure comprises a metal foil.

14. The electrochemical device according to claim 1 further comprising a material in the cavity wherein the material reacts with at least one of gas generated by the electrochemical cell and gas or material that migrates into the first enclosure.

15. The electrochemical device according to claim 1 further comprising a fitting coupled to the cavity through the sealed first enclosure via a valve wherein the fitting is in fluidic communication with the cavity then the valve is open.

16. The electrochemical device according to claim 1 wherein the electrochemical cell comprises one of a capacitor and a fuel cell.

17. The electrochemical device according to claim 1 wherein the electrochemical cell comprises a battery cell.

18. The electrochemical device according to claim 17 wherein the electrochemical cell comprises a lithium salt.

19. The electrochemical device according to claim 17 wherein the battery cell is one of cylindrical, prismatic, or flat.

20. The electrochemical device according to claim 17 wherein the battery cell is cylindrical and the electrochemical device further comprises a cavity structure within the first enclosure for forming the cavity within the first enclosure, the cavity structure comprising a core of the cylindrical battery cell.

21. The electrochemical device according to claim 17 wherein the battery cell is prismatic and top and bottom portions of the first enclosure are flexible and side portions of the first enclosure are rigid.

22. The electrochemical device according to claim 17 wherein the battery cell is prismatic and top and bottom portions of the first enclosure are rigid and side portions of the first enclosure are flexible.

23. The electrochemical device according to claim 17 wherein the battery cell comprises a liquid electrolyte.

24. An electrochemical device comprising:
a. a sealed first enclosure having at least a portion that is flexible;
b. an electrochemical cell located within the first enclosure;
c. a sealed second enclosure wherein the sealed first enclosure and the electrochemical cell are contained within the sealed second enclosure; and
d. at least one cavity formed within at least one of the second enclosure outside the first enclosure and the first enclosure so that the cavity is in fluidic communication with the electrochemical cell, and pressure inside the sealed first enclosure is less than the pressure outside the sealed second enclosure.

25. An electrochemical device comprising:
a. a plurality of sealed first enclosures, each having at least a portion that is flexible;
b. a plurality of electrochemical cells, each cell located within a respective one of the plurality of first enclosures and electrically coupled to each other;
c. a sealed second enclosure containing therein the plurality of sealed first enclosures and their respective electrochemical cells; and
d. at least one cavity formed within at least one of the second enclosure outside the first enclosures and each of the plurality of first enclosures so that the cavity is in fluidic communication with the electrochemical cell, and pressure inside the plurality of sealed first enclosures is less than the pressure outside the sealed second enclosure.

26. The electrochemical device according to claim 25 wherein the second enclosure has at least a portion that is flexible.

27. The electrochemical device according to claim 25 wherein the plurality of electrochemical cells comprises at least one of a capacitor and a fuel cell.

28. The electrochemical device according to claim 25 wherein the plurality of electrochemical cells comprise a battery cell.

29. The electrochemical device according to claim 25 further comprising an outer cavity structure forming an outer cavity within the second enclosure and outside the plurality of first enclosures, the outer cavity structure in fluidic communication with the plurality of first enclosures so that gas migrating out of the first enclosures may accumulate in the outer cavity.

30. The electrochemical device according to claim 25 further comprising a plurality of cavity structures for forming the cavity within each of the plurality of first enclosures.

31. The electrochemical device according to claim 30 wherein the second enclosure has rigid side walls and at least one of a top and bottom that is flexible.

* * * * *